G. H. ZEAL.
CASE FOR CLINICAL THERMOMETERS.
APPLICATION FILED FEB. 9, 1911.

1,019,289.

Patented Mar. 5, 1912.

Witness

Inventor
Giles H. Zeal

UNITED STATES PATENT OFFICE.

GILES H. ZEAL, OF LONDON, ENGLAND.

CASE FOR CLINICAL THERMOMETERS.

1,019,289.  Specification of Letters Patent.  Patented Mar. 5, 1912.

Application filed February 9, 1911. Serial No. 607,480.

*To all whom it may concern:*

Be it known that I, GILES HENRY ZEAL, a subject of the King of Great Britain, residing at 82 Turnmill street, London, E. C., England, thermometer manufacturer, have invented certain new and useful Improvements in Cases for Clinical Thermometers, of which the following is a specification.

My invention relates to clinical thermometers and their cases in which a spring or other resilient connection is provided whereby the thermometer may be swung in to return the mercury speedily to the bulb. Hitherto in such devices, the thermometer has been permanently attached to a reversible cap, which is objectionable from hygienic and practicing points of view, and the resilient connection has been so disposed with regard to the thermometer that the latter had to be swung while still attached to the end of the case which served as the handle, thereby exposing the thermometer to great risk of breakage.

My invention consists in providing one end of the case with a resilient continuation or extension, which may terminate with a thumb screw and finger piece, so that the thermometer has to be replaced within its case before the swinging motion is imparted to it.

The accompanying drawings illustrate several embodiments of the invention.

Figure 1:
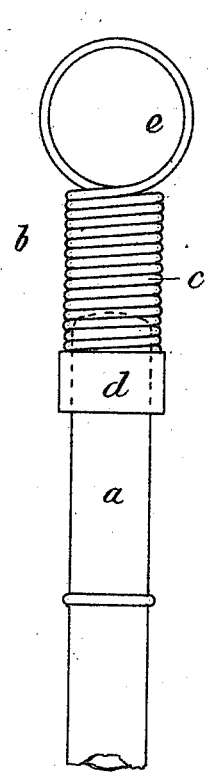
Figure 2:
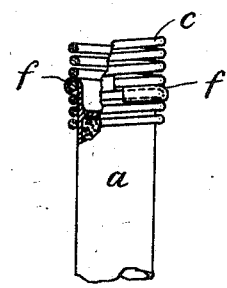

Figure 1 is an elevation of the cap end of a thermometer case fitted with a resilient extension. Fig. 2 is a modification of Fig. 1. Figs. 3, 4, 5, 6 and 7 are examples of alternative constructions.

In all the figures $a$ represents the cap of a thermometer case and $b$ represents the resilient extension, which when in use projects beyond the end of the case. But it will be understood that, although the examples show the resilient extension arranged upon the end of the cap, it is always arranged at the end of the case which is opposite to that at which the bulb of the thermometer is normally located.

Referring to Fig. 1, the cap $a$ is provided with a resilient extension formed as a helical spring $c$, attached to the cap by the band $d$, which may be fixed to the cap or may be arranged to slide thereupon so that the spring $c$ may telescope upon the cap. Preferably, the free end of the spring $c$, which is gripped by the thumb and finger, is provided with a finger piece $e$ formed by a coil or coils of the same wire which forms part of the spring $c$. In the modification shown in Fig. 2, the helical spring $c$ is attached to the cap by a single screw thread or helical housing formed by rolling over the top edge of the cap so as to inclose a single coil of the spring as shown at $f$. By this means, the spring $c$ may be extended or telescoped by rotating the same in the corresponding direction.

Figure 3:
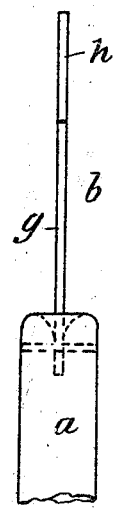

In Fig. 3, the resilient extension consists of a plate spring $g$ secured in the end of the cap $a$ and formed with a finger piece $h$.

Figure 4:
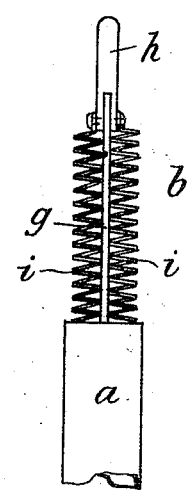
Figure 5:

In Figs. 4 and 5, the resilient extension consists of a plate spring $g$ and finger piece $h$, as in Fig. 3, with the addition of two small helical springs $i$ arranged one on each side of the plate spring $g$. The springs $g$ and $i$ are secured to the cap and to the finger piece, and the springs $i$ serve to reinforce the plate spring $g$ and obviate fracture through undue violence.

Figure 6:
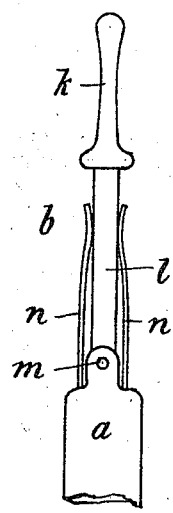

In Fig. 6, the finger piece $h$ is formed with a tongue $l$ which is pivoted at $m$ to the cap $a$, the resilient action being provided by the springs $n$ which are fixed in the cap and impinge against the sides of the tongue $l$.

Figure 7:
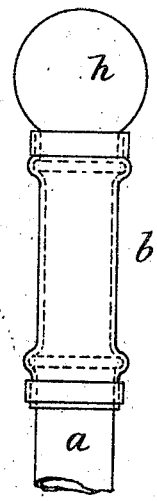

Fig. 7 shows the resilient extension $b$ formed of a short length of rubber tube.

It will be seen that the thermometer is a separate article and is in no way permanently attached to the cap or the case.

I claim:—

A thermometer case provided with a resilient permanently secured extension projecting from a closed end of said case and structurally independent of the thermometer contained in said case, as set forth.

In testimony whereof I have hereunto set my hand in presence of two subscribing witnesses.

GILES H. ZEAL.

Witnesses:
GEORGE DOWNING,
WALTER J. SKERTEN.